United States Patent [19]
Christie et al.

[11] Patent Number: 4,598,009
[45] Date of Patent: Jul. 1, 1986

[54] EMBOSSED MATERIAL AND METHOD FOR PRODUCING THE SAME FROM A PHOTOCROSSLINKABLE POLYURETHANE

[75] Inventors: Peter A. Christie, Lancaster, Pa.; Charles E. Hoyle, Hattiesburg, Miss.

[73] Assignee: Armstrong World Industries, Inc., Lancaster, Pa.

[21] Appl. No.: 650,208

[22] Filed: Sep. 13, 1984

[51] Int. Cl.$^4$ ............................ B05D 3/06; B05D 5/00
[52] U.S. Cl. .................................... 428/172; 427/54.1; 427/271; 427/277
[58] Field of Search ................ 427/54.1, 44, 277, 278, 427/244, 264, 271; 428/160, 172

[56]  References Cited
U.S. PATENT DOCUMENTS 4,210,693  7/1980  Regan et al. ..................... 428/172 X
4,225,374  9/1980  Kaufmann ....................... 428/172 X
4,293,599 10/1981  Hori et al. ........................ 427/278 X
4,358,476 11/1982  Zimmer et al. ................. 427/54.1 X
4,393,187  7/1983  Boba et al. ....................... 428/160 X

OTHER PUBLICATIONS

Williams, D. J., "Polymer Science and Engineering," Englewood Cliffs, N.J., Prentice-Hall, 1971, pp. 9–10.

Primary Examiner—Evan K. Lawrence

[57]  ABSTRACT

The invention is directed to an embossed material and a method of producing such an embossed material by utilizing a coating system which is adaptable to being crosslinked subsequent to being embossed. The system comprises a linear polyurethane that contains sites of unsaturation only in its polymeric backbone and a photoinitiator. The polyurethane is produced by the reaction of a diisocyanate and an unsaturated polyester diol. The coating system is applied to a substrate, is embossed, and is irradiated to crosslink the polyurethane coating and permanently fix the embossed pattern.

8 Claims, No Drawings

EMBOSSED MATERIAL AND METHOD FOR PRODUCING THE SAME FROM A PHOTOCROSSLINKABLE POLYURETHANE

BACKGROUND OF THE INVENTION

Utilizing polyurethanes in photoreactive polymer systems is known in the art. Generally, such systems are unsaturated acrylate or methacrylate terminated polyurethanes obtained by the reaction of hydroxyalkyl acrylate or methacrylate esters or N-metholacrylamide with isocyanate end groups in the polyurethanes and require, in addition to the polyurethane, at least one added polymerizable monomer to cause a photocrosslinking reaction.

Such prior art photoreactive systems are applied to a substrate in liquid form and, as such, cannot be effectively embossed. Coatings embossed in such a fluid state would not retain any dimensionality and would flow and level. Such coatings could only be embossed after being converted via irradiation to a cured, cross-linked, network and, as such, could not be embossed very sharply. In other photoreactive polymer systems, such as those used in imaging systems, a photoactive unsaturated side chain or a pendant substituent such as cinnamate or benzylideneacetone is required to produce the desired photocross-linking.

SUMMARY OF THE INVENTION

The present invention provides for an embossed material and a method for producing such an embossed material. This method utilizes a tack-free, non-liquid, thermoplastic film that, unlike the prior art liquid photoreactive systems discussed above, can be embossed prior to being cross-linked and thus can be embossed much more sharply than a film capable of being embossed only after cross-linking. Upon being cross-linked, the film will be converted to a product with a sharp, clearly defined, permanently embossed surface.

Such desirable characteristics are realized by a photoreactive coating system that is comprised of (a) a linear polyurethane that contains sites of unsaturation, that is, carbon-carbon double bond moieties, only in its polymeric backbone and (b) a photoinitiator. The polyurethanes utilized in this coating system are produced by a reaction of a diisocyanate and an unsaturated polyester diol. Unlike prior art photoreactive polyurethanes, no added polymerizable monomer is required for cross-linking of the polyurethanes described herein.

The method of the present invention for producing an embossed material comprises the steps of applying to a substrate a coating of unsaturated polyurethane as defined above in combination with a photoinitiator, embossing the polyurethane coating and thereafter irradiating the coating with actinic radiation to crosslink the polyurethane. Prior to being embossed, it is preferred that the coating be subject to air drying and curing to evaporate any solvent carrier for the polymer and to chain extend the polymer.

It has been found that embossed materials made by this method have sharper and deeper embossing than conventional embossed polyurethanes materials which are typically thermally crosslinked prior to embossing.

The polyurethanes utilized in the present invention should contain a sufficient amount of unsaturated sites in their polymeric backbones to permit cross-linking. However, the ideal level of unsaturated sites in the polyurethane will depend to a great extent on the end use application of the coating. For example, when the materials are to be used as coatings for resilient flooring, it has been discovered that typically from about 3 to about 6 mol percent of unsaturated sites will provide for a product with the optimum wear appearance properties.

The aromatic, aliphatic or alicyclic diisocyanates used to prepare the polyurethanes utilized in the coating systems described herein are of the general formula

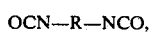

wherein R is either $R_1$ or $R_2$—$CH_2$—$R_3$, wherein $R_1$, $R_2$ and $R_3$ independently represent organic radicals selected from the group of alkyl, cycloalkyl, and aryl. The term "alkyl" is used herein to represent both straight and branched chain alkyl groups having from 1 to about 6 carbon atoms. The term "cycloalkyl" refers to a cycloalkyl group having 3 to 7 carbon atoms. The term "aryl" represents phenyl, naphthyl, toluyl or xylyl radicals.

The polyester diols that are reacted with the above diisocyanate to prepare the polyurethanes utilized in the coating system described herein are random copolymers that generally have a number average molecular weight in the range of from about 1500 to about 2500, with a preferred molecular weight of about 2000. These polyester diols are prepared by reacting at least one diacid with at least one diol. Of the diacids utilized, at least one will provide the unsaturated component in the backbone of the random polyester diol and, subsequently, in the backbone of the polyurethane itself. The preferred unsaturated diacid will be of the fumaric or maleic type such as, but not limited to, maleic acid, fumaric acid, mesaconic or citraconic acid, (which are the 2-methyl substituted derivatives of, respectively, fumaric and maleic acids).

Additional diacids that may be utilized in the preparation of the polyester diol will be of the general formula

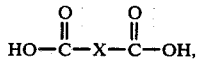

where X can be alkyl (straight chain or branched), alkenyl, or aryl moiety.

Diols suitable for use in the preparation of the polyester diol will be of the general formula

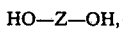

wherein Z is either $Z_1$ or $Z_2$—O—$Z_3$, wherein $Z_1$, $Z_2$ and $Z_3$ are independently selected from alkyl and cycloalkyl radicals.

The reactants utilized to produce the polyurethanes utilized in the present invention must be difunctional to provide for a linear, thermoplastic polymer. The use of trifunctional reactants, such as glycerol or a triisocyanate, would result in a premature cross-linking, i.e., prior to UV irradiation, which would not be desirable in the present system.

The polyurethanes utilized in the present invention are prepared by the reaction of the components specified above according to reaction conditions well known to those skilled in the art, i.e., the reaction will generally be run in a dry organic solvent medium in the presence of an appropriate tin catalyst. Typical reaction temperatures of about 100° C. will lead to the desired polyurethane formation.

In preparing a photocurable coating formulation utilized in accordance with the present invention, the aforementioned unsaturated polyurethane is combined with a photoinitiator which is effective in initiating crosslinking of the polymer on exposure to radiation. For this purpose, the photoinitiator is advantageously benzophenonone or phenylacetophenone derivates such as benzil, benzoin, and the benzoin ethers, e.g., benzoinmethyl, -ethyl, -n-propyl and -isopropyl ethers. While the amount and type of photoinitiator employed will vary with the intensity and dosage of radiant energy to be employed and the specific polyurethane being utilized, the photoinitiator is usually employed in amounts from about 1 to about 20 and preferably from about 5 to about 10 weight percent based on the weight of the resin making up the coating formulation.

In addition to the foregoing photoinitiators, other additives such as impact modifiers (rubber polymers and elastomers), pigments and fillers, stabilizers, fire retardants, etc., can be employed in the coating composition of the present invention. The specific additives utilized will depend on the desired end use of the coating composition.

After being embossed, the coating or film utilized in the present invention is then exposed to sufficient actinic radiation to cure the coating or film to a material that is insoluble in aqueous or organic liquid media. For purposes of this invention, actinic radiation is defined as being any radiation which will cause the desired crosslinking reaction in the presence of a photoinitiator.

An example of actinic radiation advantageously employed is ultraviolet light. When employing ultraviolet light radiation, suitable intensity is supplied by mercury vapor lamps.

The polyurethane coatings made according to one aspect of the present invention may be utilized to coat substrates such as resilient flooring, wood panels, paper, plastic sheets, sheet metal, structural foam and the like. The coatings are readily cast, sprayed or otherwise applied as films or coatings to substrates by conventional coating techniques employed by those skilled in the art. Typically, the thickness of the film or coating will vary from about 0.025 mm to about 0.25 mm. The actual thickness utilized of course depends on the specific end use of the coating composition.

The following examples are given to illustrate embodiments of the invention and should not be construed as limiting its scope. In these examples, all parts and percentages are by weight unless otherwise indicated. Where used in the Tables in the examples, the abbreviation "P.I." stands for "photo-initiator", the abbreviation "IRR." stands for "irradiation", the abbreviation "Insol." stands for "insoluble" and the abbreviation "Tg" stands for "glass-transition temperature", as defined in D. J. Williams, "Polymer Science and Engineering", pp. 9–10, Prentice-Hall, Englewood Cliffs, N.J., 1971.

EXAMPLE 1

This example sets forth the procedure for preparing a polyurethane utilized in the present invention. The polyurethane is obtained by the reaction of a cycloaliphatic diisocyanate, 4,4'-methylenebis(cyclhexyl isocyanate), (22 wt-%) and a partially aromatic unsaturated polyester diol (78 wt-%) with an acid number 0.4 and a hydroxyl number 56 of the following formulation:

| Isopthalic Acid | 3.0 equivalents |
| Azelaic Acid | 10.5 equivalents |
| Fumaric Acid | 6.5 equivalents |
| Cyclohexanedimethanol | 18.2 equivalents |
| Ethylene Glycol | 4.5 equivalents |

The reactants and excess toluene are charged into a reactor equipped with a stirrer and distillation head. Sufficient toluene (100 ml) is distilled off under a dry air steam to remove any residual moisture from the reaction mixture, and 0.06% by weight of a dimethyltindineodecanoate catalyst is added. The reaction mixture is heated at 105° C. for 20 minutes and then cooled to room temperature.

There was formed a polyurethane (40.5% solids in toluene) containing 5 mol-% unsaturation of the fumarate type.

EXAMPLE 2

The polyurethane of Example 1 is moisture-cured at room temperature to give a thermoplastic coating film which can be readily embossed to give fine embossing detail. Addition of a photoinitiator prior to air curing (Irgacure 651$^R$, a trademark of Ciba Geigey Corp. for dimethoxyphenylacetophenone photoinitiator) at 10 weight percent based on polymer solids provided a composition which was crosslinked by exposure to an ultraviolet light source to give a largely insoluble network. The crosslinked composition was compared in a series of tests to a non-irridiated, non-crosslinked composition to demonstrate the changes in Tg and percent insolubility in the coating. The results are set forth below:

TABLE 1

| P.I. | IRR. Time$^a$ | Tg | % Insol$^b$ |
| --- | --- | --- | --- |
| None | — | +2° C. | 0.2 |
| 10% | 5 min. | +4° C. | 84.9 |
| 10% | 30 min. | +18° C. | 92.8 |

$^a$Hanovia 450 W Hg lamp
$^b$Toluene at 100° C.

EXAMPLE 3

This example shows the preparation of an unsaturated polyurethane and the utilization of that polyurethane in the process of the present invention. This composition is the reaction product of 4,4'-methylenebis(cyclohexyl isocyanate) (22 wt-%) and a lower fumarate content polyester diol (78 wt-%) than that of Example 1, said polyester having an acid number 0.2 and a hydroxyl number 56 and the following formulation:

| Isopthalic Acid | 4.0 equivalents |
| Azelaic Acid | 12.75 equivalents |
| Fumaric Acid | 3.25 equivalents |
| Cyclohexanedimethanol | 18.2 equivalents |
| Ethylene Glycol | 4.6 equivalents |

The resulting polyurethane (52.5%) solids in toluene containing 3 mole-% fumarate-type unsaturation was moisture-cured at room temperature to give a thermoplastic coating which was readily thermally embossable to give sharp, embossed images. Admixture of benzophenone (5% by weight of resin solids) as a photoinitiator prior to air curing gave a cross-linkable film on exposure to a UV radiation source. Properties of the non-crosslinked and crosslinked films are tabulated below:

TABLE 2

| P.I. | IRR. Time[a] | Tg | % Insol.[b] |
|---|---|---|---|
| None | — | −0.5° C. | 0.4 |
| 5% BZP | 5 min. | +1.5° C. | 85.7 |
| 5% BZP | 30 min. | +10.5° C. | 89.7 |

[a] & [b] same as Table 1

EXAMPLE 4

This composition is a totally aliphatic polyurethane obtained by the reaction of 4,4'-methylenebis(cyclohexyl isocyanate) (21 wt-%) which an unsaturated polyester diol (79 wt-%) based on maleic acid as the unsaturated component, said polyester having an acid number 0.2 and a hydroxyl number 54 and the following formulation:

| | |
|---|---|
| Azelaic Acid | 14.0 equivalents |
| Maleic Anhydride | 6.0 equivalents |
| Cyclohexanedimethanol | 22.8 equivalents |

The resulting polyurethane (40.5% solids in toluene) containing 5 mol-% maleate-type unsaturation. After admixture of 10% Irgacure 651[R] photoinitiator, the polyurethane was moisture-cured at room temperature to give a thermoplastic coating which produces sharply detailed, embossed images on thermal embossing. The polyurethane was then crosslinked by exposure to a UV light source. Properties of the non-crosslinked and crosslinked films are tabulated below:

TABLE 3

| P.I. | IRR. Time[a] | Tg | % Insol.[b] |
|---|---|---|---|
| None | — | +4.5° C. | 0.3 |
| 10% | 5 min. | +2° C. | 72.9 |

TABLE 3-continued

| P.I. | IRR. Time[a] | Tg | % Insol.[b] |
|---|---|---|---|
| 10% | 30 min. | +4° C. | 84.4 |

[a] & [b] same as Table 1

What is claimed is:
1. A method for producing an embossed material which comprises the steps of:
   (a) applying to a substrate an embossable and crosslinkable coating comprising a linear polyurethane in combination with a photoinitiator that is effective in crosslinking the polyurethane upon exposure to actinic radiation, said linear polyurethane containing unsaturated sites only in the polymeric backbone thereof;
   (b) embossing the coating to thereby form a desired pattern thereon; and
   (c) irradiating the embossed coating with actinic radiation to thereby crosslink the polyurethane coating and permanently fix the embossed pattern.
2. The method of claim 1 wherein the unsaturated polyurethane is produced by the reaction of a diisocyanate with a random polyester diol, said random polyester diol containing sites of unsaturation in its backbone.
3. The method of claim 2 wherein the random polyester diol is produced by the reaction of at least one diol with at least one diacid, said at least one diacid comprising at least one unsaturated diacid and further wherein the sites of unsaturation in the backbone of the polyester diol are derived from said at least one unsaturated diacid.
4. The method of claim 3 wherein said at least one unsaturated diacid is fumaric acid, maleic acid, or a derivative thereof.
5. The method of claim 1 wherein the photo-initiator is benzophenone, phenylacetophenone or a derivative thereof.
6. The method of claim 5 wherein the photoinitiator is dimethoxyphenylacetophenone.
7. The method of claim 5 wherein the photoinitiator is benzophenone.
8. The embossed material formed by the method of claim 1.

* * * * *